United States Patent
Patterson et al.

(10) Patent No.: US 10,015,125 B2
(45) Date of Patent: Jul. 3, 2018

(54) DIRECTORY GENERATION AND MESSAGING

(71) Applicant: Zinc, Inc., San Francisco, CA (US)

(72) Inventors: James Robert Patterson, San Francisco, CA (US); Zachary Thomas Parker, San Francisco, CA (US)

(73) Assignee: Zinc, Inc., San Francisco, CA (US)

( * ) Notice: Subject to any disclaimer, the term of this patent is extended or adjusted under 35 U.S.C. 154(b) by 346 days.

(21) Appl. No.: 14/732,934

(22) Filed: Jun. 8, 2015

(65) Prior Publication Data

US 2015/0370918 A1 Dec. 24, 2015

Related U.S. Application Data

(60) Provisional application No. 62/014,917, filed on Jun. 20, 2014.

(51) Int. Cl.
*H04L 12/58* (2006.01)
*H04L 29/12* (2006.01)
*G06Q 10/10* (2012.01)

(52) U.S. Cl.
CPC ............. *H04L 51/22* (2013.01); *G06Q 10/10* (2013.01); *G06Q 10/107* (2013.01); *H04L 61/1594* (2013.01)

(58) Field of Classification Search
CPC .................... G06Q 10/10; H04L 61/1594
See application file for complete search history.

(56) References Cited

U.S. PATENT DOCUMENTS

| | | | |
|---|---|---|---|
| 6,654,813 B1 * | 11/2003 | Black | G06F 17/30899 707/E17.111 |
| 2002/0138582 A1 | 9/2002 | Chandra et al. | |
| 2004/0083297 A1 * | 4/2004 | Gazzetta | H04L 63/083 709/229 |
| 2005/0065980 A1 * | 3/2005 | Hyatt | G06F 17/30604 |
| 2006/0095437 A1 * | 5/2006 | Bazot | G06Q 10/02 |
| 2006/0136419 A1 | 6/2006 | Brydon et al. | |
| 2006/0224675 A1 | 10/2006 | Fox et al. | |
| 2011/0270668 A1 * | 11/2011 | Fagan | G06Q 10/00 705/14.36 |

(Continued)

FOREIGN PATENT DOCUMENTS

KR    10-2009-0128227 A    12/2009

OTHER PUBLICATIONS

PCT International Search Report and Written Opinion, PCT Application No. PCT/US2015/034630, dated Sep. 10, 2015, twelve pages.

(Continued)

*Primary Examiner* — William Spieler
(74) *Attorney, Agent, or Firm* — Fenwick & West LLP

(57) ABSTRACT

Contacts information is received from user devices that are associated with different users, the contacts information for each user device comprising one or more contact entries. Lookup information is identified for each contact entry of a plurality of contact entries using the contacts information. For each of the plurality of contact entries, a messaging directory associated with the same enterprise as the contact entry is identified using the identified lookup information, and the identified messaging directory is generated using information in the contact entry.

20 Claims, 5 Drawing Sheets

(56) References Cited

U.S. PATENT DOCUMENTS

2013/0036023 A1\* 2/2013 Koplovitz .............. G06Q 30/06
                                                          705/26.8
2013/0218999 A1   8/2013 Martin
2015/0264312 A1\* 9/2015 Chastney ............... H04N 7/148
                                                          715/719

OTHER PUBLICATIONS

Canadian First Office Action, Canadian Application No. 2,952,419, dated Oct. 25, 2017, 6 pages.

\* cited by examiner

DIRECTORY GENERATION AND MESSAGING

CROSS-REFERENCE TO RELATED APPLICATIONS

This application claims the benefit of U.S. Provisional Application No. 62/014,917, filed Jun. 20, 2014, which is hereby incorporated by reference in its entirety.

BACKGROUND

Field of Disclosure

This disclosure relates to the field of electronic messaging, and specifically to generating messaging directories associated with enterprise systems and messaging members of those directories.

Description of the Related Art

In many industries enterprise systems are not accessible to all employees. For example, an employee in customer service (e.g., a barista) who works in a large coffee chain is typically excluded from company enterprise communications. These types of employees generally receive information via a message board, face-to-face discussions, etc.

Moreover, an increasing fraction of the population uses mobile devices to communicate, via, e.g., email and/or SMS messaging. Email has long been a prevalent method of communication between users for work-related communications. In contrast, SMS messaging is generally the dominant method of communication for personal communications. While many people have mobile devices that are used for both personal and businesses uses, they generally use email for work related communications and SMS messaging for personal communications. Accordingly, companies and/or employees lack a cross-platform enterprise mobile solution that provides both the simplicity and familiarity of short message service (SMS) and the security of a business solution.

SUMMARY

The above and other needs are met by a computer-implemented method, a non-transitory computer-readable storage medium storing executable code, and a device for generating messaging directories.

One embodiment of the computer-implemented method for generating messaging directories, comprises receiving contacts information from user devices that are associated with different users, the contacts information for each user device comprising one or more contact entries. Lookup information is identified for each contact entry of a plurality of contact entries using the contacts information. For each of the plurality of contact entries, a messaging directory associated with the same enterprise as the contact entry is identified using the identified lookup information, and the identified messaging directory is generated using information in the contact entry.

One embodiment of a non-transitory computer-readable storage medium storing executable computer program instructions for generating messaging directories, comprises receiving contacts information from user devices that are associated with different users, the contacts information for each user device comprising one or more contact entries. Lookup information is identified for each contact entry of a plurality of contact entries using the contacts information. For each of the plurality of contact entries, a messaging directory associated with the same enterprise as the contact entry is identified using the identified lookup information, and the identified messaging directory is generated using information in the contact entry.

One embodiment of a system for generating messaging directories, comprises a processor configured to execute modules, and a memory storing the modules. The modules include an information selection module configured to receive contacts information from user devices that are associated with different users, the contacts information for each user device comprising one or more contact entries. The information selection module is also configured to identify lookup information for each contact entry of a plurality of contact entries using the contacts information. The modules also include a directory identification module configured to, for each of the plurality of contact entries, identify, using the identified lookup information, a messaging directory associated with the same enterprise as the contact entry. The modules also include a directory generation module configured to, for each of the plurality of contact entries, generate the identified messaging directory using information in the contact entry.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
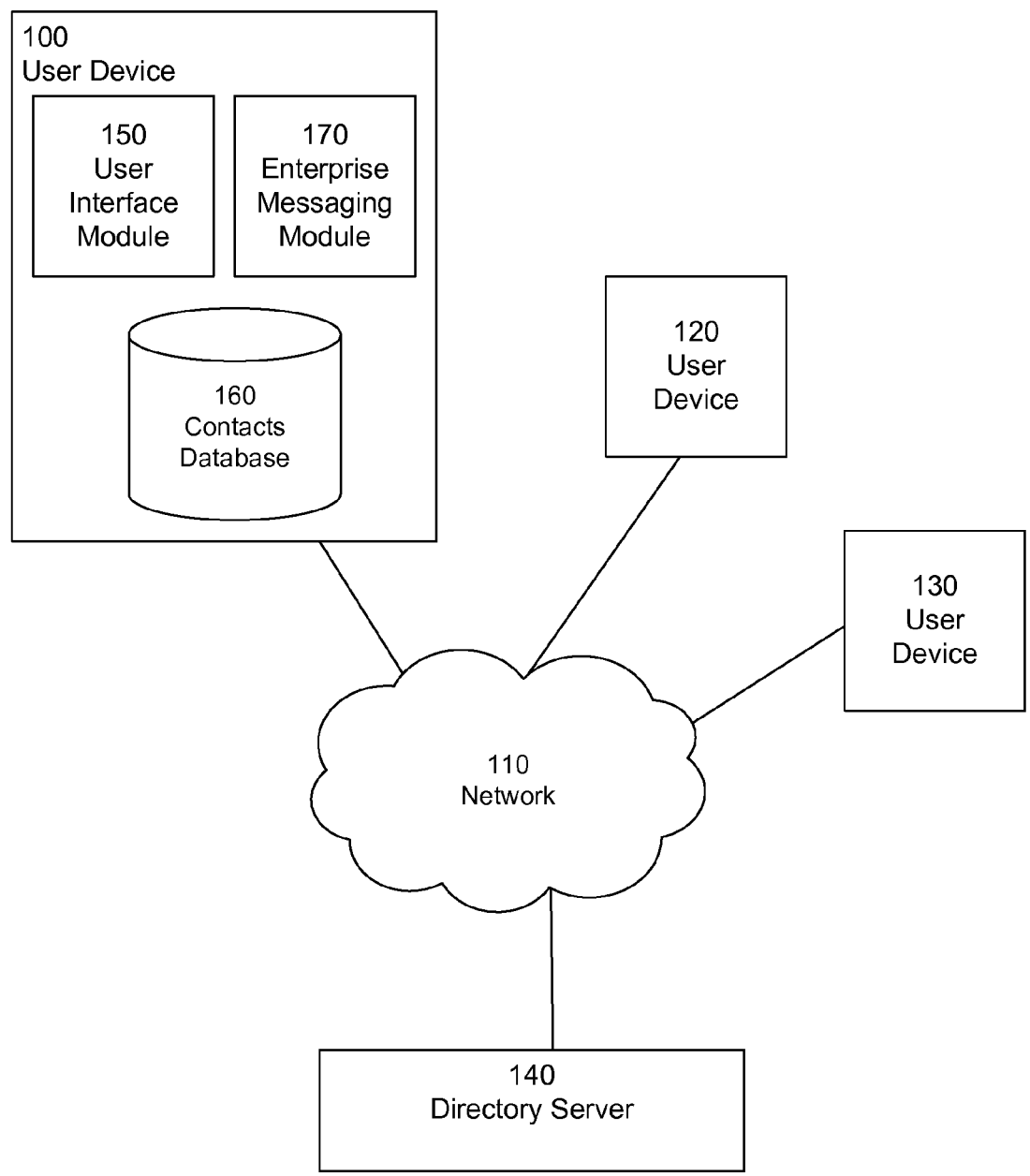
FIG. 1 is a high-level block diagram illustrating an embodiment of an environment for generating messaging directories and messaging members of those directories.

FIG. 1 is a high-level block diagram illustrating an embodiment of an environment for generating messaging directories and messaging members of those directories. The environment includes a user device 100 connected by a network 110 to two other user devices 120 and 130, and a directory server 140. Here only three user devices 100, 120, and 130, and one directory server 140 are illustrated, but there may be multiple instances of each of these entities. For example, there may be thousands or millions of user devices 100, 120, and 130 in communication with multiple directory servers 140.

The network 110 provides a communication infrastructure between the user device 100, the user device 120, the user device 130, and the directory server 140. The network 110 is typically the Internet, but may be any network, including but not limited to a Local Area Network (LAN), a Metropolitan Area Network (MAN), a Wide Area Network (WAN), a mobile wired or wireless network, a private network, a virtual private network, or some combination thereof.

The user device 100 is a computing device that executes computer program modules that allow a user to perform messaging within an enterprise. Additionally, the modules allow a user to store contacts information, send messages, receive messages, or some combination thereof, on the user device 100. The user device 100 might be, for example, a personal computer, a tablet computer, a mobile phone, a smart phone, a laptop computer, GOOGLE GLASS®, a dedicated e-reader, or other type of network-capable device.

The user device 100 comprises a user interface module 150, a contacts database 160, and an enterprise messaging module 170. In one embodiment these entities are software application modules executing on the user device 100. For example, the modules 150, 160, and 170 may be integrated into an application executing on a smart phone.

The user interface module 150 enables a user operating the user device 100 to interface with the contacts database 160 and/or the enterprise messaging module 170. The user interface module 150 receives contacts information from the user. The user interface module 150 populates the contacts database 160 with the received contacts information.

The contact database 160 stores the user's contacts information. Contacts information is information that describes entities (i.e., a person or business) and/or their relationship to the user. Contacts information may include, for example, one or more contact entries, calendar information, or some combination thereof. A contact entry describes characteristics of an entity. A contact entry may include, for example, a name, one or more phone numbers, a enterprise email address, a personal email address, a job title, a company name, a home address, a work address, some other characteristic of a person and/or business, or some combination thereof. The contact database 160 may be updated by the user, an exchange server, some other contact source, or some combination thereof.

In some embodiments, the user interface 150 may include a calendar that is populated by the user or some other source (e.g., user device 120, user device 130) with calendar information. Calendar information is information used to generate one or more calendar entries in the user's calendar. Calendar information may include, for example, attendee names, attendee email addresses, a meeting location, conference dial-in information, a subject, a meeting date/time, meeting notes, some other information that is part of the calendar entry, or some combination thereof.

The enterprise messaging module 170 enables a user associated with an enterprise system to message other users who are associated with the same enterprise as the user. An enterprise is a business. The enterprise includes one or more mail servers, and is associated with one or more email domains (e.g., specified by the domain component of an email address). A user is associated with an enterprise if, for example, the user has an email address (i.e., a user's enterprise email address) that includes a domain component that is associated with an email domain of the enterprise. The enterprise messaging module 170 receives message content from the user via a messaging interface. The messaging interface is a graphical user interface that enables the user to interact with the enterprise messaging module 170. For example, the user may compose a message, identify recipients for the message, send the message, receive a message, perform some other message related function, or some combination thereof. The message content may include text, video, hyperlinks, polls, some other form of content, or some combination thereof.

The enterprise messaging module 170 presents to the user a messaging directory that is associated with the user. The messaging directory is a database of directory entries (e.g., of people, groups, businesses, etc.) who are associated with the same enterprise. Additionally, the user of the user device 100 may be associated with the messaging directory if the user and the messaging directory are both associated with the same enterprise. A directory entry includes information associated with an individual entity (e.g., Joe Smith) or a group of entities that are all associated with the same enterprise (employees of San Francisco office, human resources group, sales team, etc.). Additionally, in some embodiments, the enterprise messaging module 170 enables the user to request a directory entry be created by the directory server 140 that is representative of a group of directory entries.

As described in detail below with regard to FIG. 3, in some embodiments, only some of the information in the directory entries is available for presentation to the user. For example, in some embodiments, only a name associated with a directory entry is available to present to the user. Limiting the information presented to the user prevents disclosure of personal information (e.g., a home address) in directory entries to the user without affecting their ability to message people and/or groups associated with the enterprise. In some embodiments, the user is able to adjust privacy settings that determine what information may be presented in a directory entry associated with the user to other users associated with the same enterprise as the user. Thus, adding security to the system without compromising the messaging abilities of the system.

The enterprise messaging module 170 generates recipient information based on directory entries (e.g., Joe Smith, San Francisco Office, Human Resources Team, etc.) selected by the user to receive the message, and generates the message using the message content and the recipient information. The enterprise messaging module 170 sends the generated message to the directory server 140 for distribution to one or more recipients based on the recipient information. As discussed in detail below, the directory server 140 sends the message as a push notification to recipient user devices that include an enterprise messaging module 170 and as an email to recipients whose user devices do not include an enterprise messaging module 170.

The enterprise messaging module 170 presents received messages to the user. The enterprise messaging module 170 may present a received message to the user via, e.g., the messaging interface. The message may be received from the directory server 140 and/or a mail server associated with an enterprise associated with the user. If a message was sent to the user using an enterprise messaging module 170, the message is received from the directory server 140 and the received message is a push notification. Alternatively, if the message was sent without using an enterprise messaging module 170 (e.g., the sending user device does not include the enterprise messaging module 170), the sent message is an email. A push notification is a message that notifies the user of a new message without the user actually needing to open the messaging interface. The push notification appears as a text message that appears on the screen of the user device 100. Additionally, in cases where the user device 100 is locked such that the messaging interface is not available until the user device 100 is unlocked, the user device 100 displays the message on the lock screen of the device. After the user device 100 is unlocked, the user may interact with the received message using the messaging interface.

The messaging interface displays messages received via a push notification and/or via a enterprise email address associated with a user in a manner similar to threaded SMS. The messaging interface displays messages received from users associated with the enterprise and sent by the user to users associated with the enterprise in a back-and-forth chronological chat-like history for one or more discussion threads. A discussion thread is a group of messages between a group of users associated with the enterprise relating to a particular topic. Additionally, in some embodiments, the received message may poll the user in some manner (e.g., the received message may a questionnaire requesting feedback from the user). The enterprise messaging module 170 generates poll feedback based on the user's response to the poll, and sends the poll feedback to the directory server 140. As discussed above, the enterprise messaging module 170 presents push notification and emails to the user in a SMS like format that is familiar to the user (as users generally use SMS for personal communications). However, the messages being presented to the user are those associated with the enterprise of the user. Accordingly, the enterprise messaging module 170 is bringing a SMS-like display for communications received from user devices that include the enterprise messaging module 170 and messages received via the user's enterprise email address.

The enterprise messaging module 170 retrieves contacts information from the user device 100 and provides the contacts information to the directory server 140. Once the enterprise messaging module 170 is installed on the user device 100, the enterprise messaging module 170 automatically retrieves the user's contacts information from the contacts database 160 and provides the retrieved contacts information to the directory server 140. Additionally, in some embodiments, the enterprise messaging module 170 detects changes (e.g., addition of a new contact, addition of a enterprise email address, etc.) made to the contacts information in the contacts database 160. The enterprise messaging module 170 retrieves the changed portion of the contacts information and sends the changed portion to the directory server 140.

The enterprise messaging module 170 provides the name and enterprise email address associated with the user of the user device 100 to the directory server 140. In some embodiments, the enterprise messaging module 170 prompts the user for the information. In alternate embodiments, the enterprise messaging module 170 may extract this information from the contacts database 160. Additionally, in some embodiments, the enterprise messaging module 170 may provide other information (e.g., employer name) about the user to the directory server 140.

The user devices 120 and 130 are computing devices like the user device 100. One or both of the user device 120 and the user device 130 may include instances of the same user interface module 150, contacts database 160, enterprise messaging module 170, or some combination thereof. For example, the user device 120 may include an enterprise messaging module 170, and the user device 130 may not include an enterprise messaging module 170. In embodiments where the user device 100 sends a message to a recipient associated with user device 130 and the user device 130 does not include the enterprise messaging module 170, the recipient is able to interact with the message via email on the user device 130. For example, the recipient may review the received email and respond to the message via email.

The directory server 140 assembles one or more messaging directories associated with different enterprises using contacts information received from user devices (e.g., user device 100) that include the enterprise messaging module 170. The directory server 140 parses the contacts information into contact entries, and identifies lookup information (e.g., the domain component of an email address) for the contact entries that is used to identify associated messaging directories. The directory server 140 identifies a messaging directory associated with a contact entry using a directory lookup table and the lookup information. The directory lookup table maps identified lookup information to various messaging directories. The directory server 140 may update identified messaging directories with the information in the contact entries that are mapped to the messaging directories. Additionally, the directory server 140 may create a messaging directory if a contact entry does not map to a messaging directory identified in the directory lookup table. Thus, the directory server 140 is able to create and/or update multiple messaging directories that are each associated with different enterprises using the contacts information received from user devices (e.g., 100) that include enterprise messaging modules 170. In some embodiments, the directory server 140 may provide an updated messaging directory to its associated enterprise.

The directory server 140 provides a messaging directory associated with the user to the user device 100. In some embodiments, the directory server 140 uses the user's enterprise email and the directory lookup table to identify the associated messaging directory. If a directory entry is not already present for the user in the identified messaging directory, the directory server 140 creates a directory entry that corresponds to the user. Once the directory entry is created or if there is an existing directory entry associated with the user, the directory server 140 provides the messaging directory to the enterprise messaging module 170 on the user device 100.

The directory server 140 distributes messages received from the user device 100 to one or more recipients (e.g., user device 120 and/or user device 130) that are associated with the same enterprise as the user. The directory server 140 identifies user devices associated with the intended recipients of the message and determines a distribution technique based whether the identified user devices include an enterprise messaging module 170. For example, if the enterprise messaging module 170 is installed on user device 120, and is not installed on user device 130, a push notification is used to send the message to user device 120, and email is used to send the message to the user device 130. The directory server 140 then provides the message to the user devices 120 and 130 via the determined distribution technique. Thus, the directory server 140 is able to send messages to different user devices that may or may not include an enterprise messaging module 170.

The system disclosed herein provides companies and employees with a cross-platform enterprise mobile solution that combines the simplicity and familiarity of SMS and other consumer messaging apps with the security of a business solution. The directory server 140 is able to assemble and/or update multiple messaging directories associated with different enterprises using contacts information received from multiple user devices. Moreover, a user of the user device 100 is able to securely message anyone in a messaging directory associated with the enterprise of the user in an SMS-like manner, thus bringing the familiarity of SMS to enterprise communications. Moreover, the directory server 140 is able to effectively deliver the message to recipients regardless of whether or not the recipients have the enterprise messaging module 170 installed on their user devices.

Figure 2:
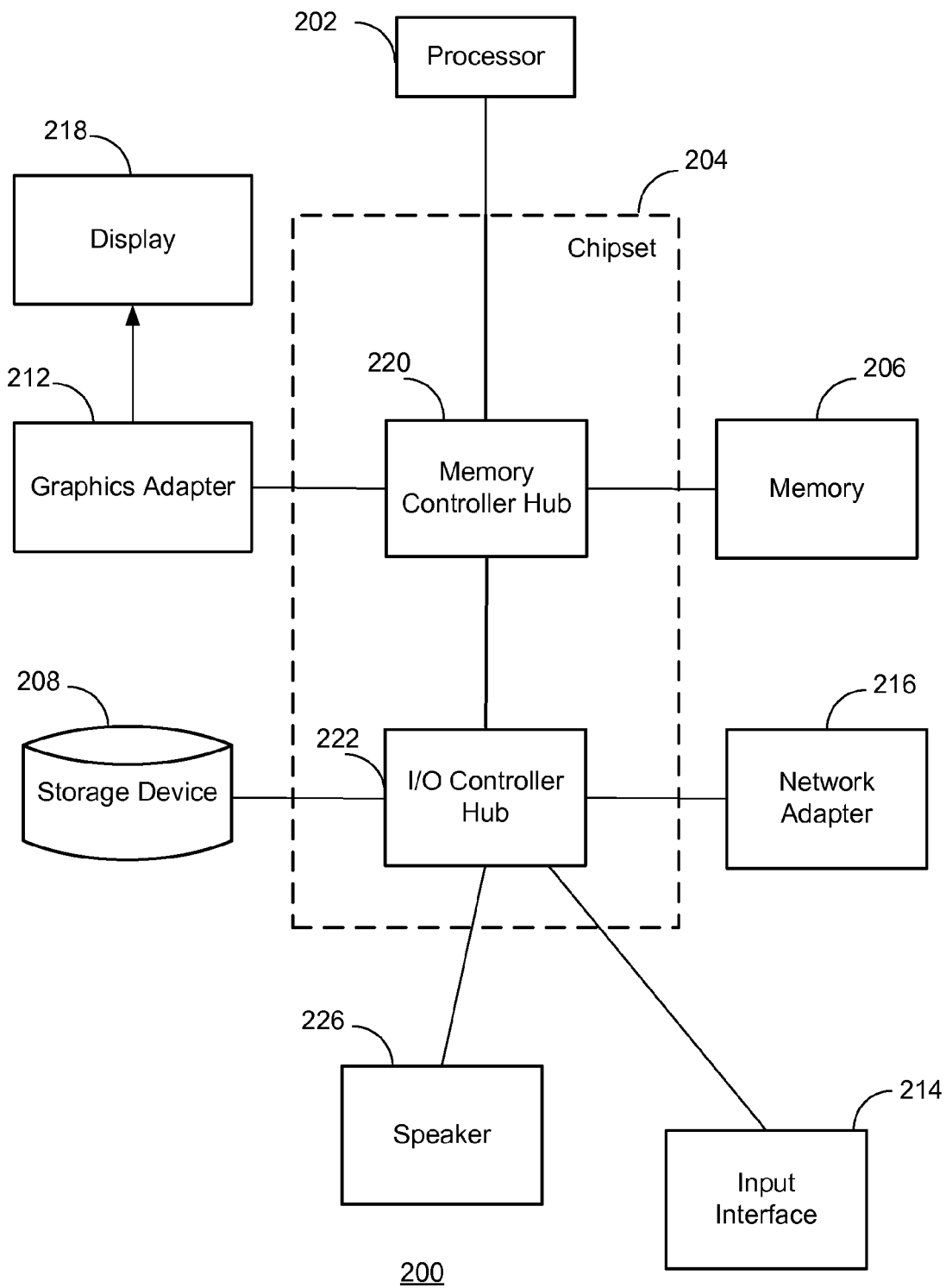
FIG. 2 is a high-level block diagram illustrating an example computer for implementing the entities shown in FIG. 1.

Turning now to a discussion of the implementation of the entities discussed above, FIG. 2 is a high-level block diagram illustrating an example computer 200 for implementing one or more of the entities shown in FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, an input interface 214, a speaker 226, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The input interface 214 is a touch-screen interface, a mouse, track ball, or other type of pointing device, a keyboard, a microphone, or some combination thereof, and is used to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computer 200 used by the entities of FIG. 1 can vary depending upon the embodiment and the processing power required by the entity. For example, the directory server 140 may include multiple computers 200 communicating with each other through a network such as in a server farm to provide the functionality described herein. Such computers 200 may lack some of the components described above, such as graphics adapters 212 and displays 218.

Figure 3:
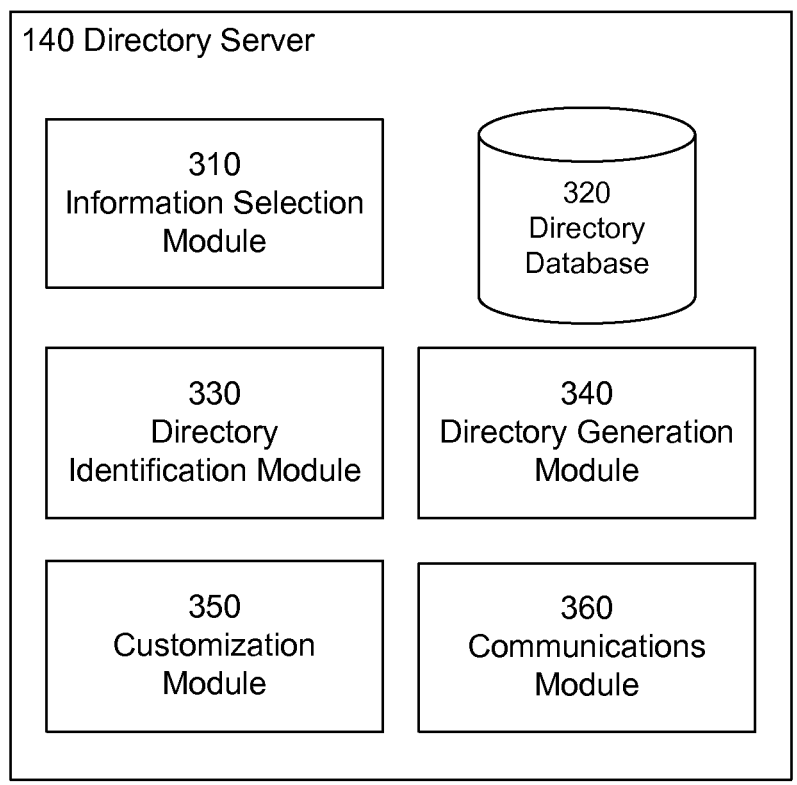
FIG. 3 is a high-level block diagram illustrating a detailed view of modules within a directory server according to one embodiment.

FIG. 3 is a high-level block diagram illustrating a detailed view of modules within the directory server 140 according to one embodiment. The directory server 140 is comprised of modules including an information selection module 310, a directory database 320, a directory identification module 330, a directory generation module 340, a customization module 350, and a communications module 360. Some embodiments of the directory server 140 have different modules than those described here. Similarly, the functions can be distributed among the modules in a different manner than is described here.

The information selection module 310 identifies lookup information using contacts information received from user devices. The information selection module 310 receives contacts information from user devices that include an enterprise messaging module 170. The information selection module 310 parses the contacts information into a set of contact entries. The information selection module 310 identifies some contact entries, of the set of contact entries, that each include lookup information. Lookup information is information associated with a contact entry that may be used with the directory lookup table to identify an associated messaging directory. Lookup information may include, e.g., the domain component of an enterprise email address, a company name, some other information that is unique to a messaging directory, or some combination thereof. A enterprise email address is an email address that maps to a particular enterprise of a business A personal email address is an email address that does not map to an enterprise and is listed in a personal domain lookup table. The personal domain lookup table lists domain components associated with personal email addresses. In one embodiment, the information selection module 310 identifies lookup information by identifying email addresses present in the contact entries and then removing any personal email addresses from the identified email addresses—such that only enterprise email addresses remain.

The information selection module 310 maintains a list (e.g., the personal domain lookup table) of personal email domains commonly used for personal email and excludes emails having those domains from the lookup information. The information selection module 310 uses a personal domain lookup table to determine whether an email address is a personal email address. The information selection module 310 attempts to match the domain components of email addresses in the contact entries to the domain components in the personal domain lookup table. If a domain component of an email address matches a domain component in the personal domain lookup table, the information selection module 310 removes the personal email address from the lookup information. If the domain component of the email address is not found in the personal domain lookup table, the information selection module 310 passes the lookup information to the directory identification module 330. The domain components in the personal domain lookup table may be specified by an administrator. Additionally, in some embodiments, the information selection module 310 may automatically update the personal domain lookup table based on information in a contact entry. For example, if the contact entry lists an email address as being a personal email address, the information selection module 310 may add the domain component of the email address to the personal domain lookup table.

The directory database 320 stores messaging directories associated with different enterprises. The directory database 320 stores the directory lookup table that maps the lookup information (e.g., domain components of enterprise email addresses) to various messaging directories. In some embodiments, the lookup table may map other information associated with contact entries to various messaging directories. For example, the directory lookup table may match a company name, some other information unique to a messaging directory, or some combination thereof, with the particular messaging directory.

The directory identification module 330 identifies which messaging directories are mapped to which contact entries using the lookup information. The directory identification module 330 matches portions of the lookup information (e.g., a domain component of a enterprise email address, some other lookup information, etc.) to a corresponding messaging directory using the directory lookup table. In some cases, the directory lookup table may not include a mapping between a messaging directory and lookup information for a particular contact entry. The directory identification module 330 then creates a new messaging directory using some or all of the lookup information. For example, the directory identification module 330 may create a new messaging directory that is associated with the domain component of a enterprise email address in the lookup information. The directory identification module 330 updates the directory lookup table with the created messaging directory and associated lookup information. Additionally, the directory identification module 330 identifies messaging directories associated with the user using information received from the user device 100 and the lookup table.

The directory generation module 340 generates messaging directories in the directory database 320 using information from the contact entries. In this context, "generates" means to create a new directory entry in a messaging directory and/or update existing directory entries in the messaging directory. As discussed above, a messaging directory may be mapped to a contact entry using the lookup information in the contact entry. The directory generation module 340 determines whether a directory entry exists in the messaging directory that corresponds to the mapped contact entry. For example, assuming the contact entry is for Joe Smith, the directory generation module 340 may determine whether there is an existing directory entry for Joe Smith. If the directory entry does not exist, the directory generation module 340 creates a new directory entry using some or all of the information in the contact entry.

If the directory entry does exist, the directory generation module 340 determines whether to update the directory entry with information from the contact entry. If the information associated with the contact entry matches the information of the directory entry, no changes are made to the directory entry. If some of the information associated with the contact entry does not match the information in the directory entry (e.g., different companies listed), the directory generation module 340 may send the user associated with the directory entry and/or the user of the user device 100 a message requesting confirmation of the information in the contact entry. For example, a confirmation may be a message asking the user to confirm whether a particular piece of information is correct. The directory generation module 340 then determines whether to update the information based on a confirmation received from the user. Or, in some embodiments, the directory generation module 340 may automatically update the directory entry with information from a contact entry, if the information in the contact entry is more recent than the information used to create the corresponding portion of the directory entry.

The directory generation module 340 may generate directory entries associated with groups of directory entries associated with the same enterprise. The directory generation module 340 may generate a directory entry that is associated with a group of directory entries based on a request received from a user device including the enterprise messaging module 170 and/or automatically. A directory entry associated with a group of directory entries may be representative of, e.g., a group of entities within a particular geographic location (e.g., state of California), a group of entities that are part of a particular portion (e.g., Sales, Human Resources, etc.) of the enterprise, work out of a particular office (e.g., San Francisco), some other grouping of entities within the enterprise, or some combination thereof. In embodiments, where the directory generation module 340 receives a request to generate a directory entry associated with a group, the directory generation module 340 identifies the messaging directory associated with the enterprise of the user and retrieves directory entries from the messaging directory that match the request. The directory generation module 340 generates a directory entry using the retrieved directory entries, and adds it to the messaging directory.

The customization module 350 customizes the order of directory entries presented to a user of the user device 100 based on the contacts information received from the user. The customization module 350 scores each of the directory entries using the contacts information (e.g., calendar information). The scoring may be based on, e.g., the number of meetings the user has with an entity associated with the directory entry, the job title specified by the contact entry in relation to the user's job title, whether the user and the entity associated with the contact entry are part of the same group (e.g., sales, same office location, etc.), whether the information in a directory entry corresponding to the entity was already part of the user's contacts information (indicates, e.g., a pre-existing connection between the user and the entity), a number of mutual connections shared by the user and the entity, a frequency of meetings the user has (and/or has scheduled) with the entity within a temporal period, or some combination thereof. The temporal period may be, e.g., a range of dates inclusive or exclusive of the current date. The customization module 350 ranks each of the directory entries, and orders them for presentation to the user according to their score. For example, Joe Smith may have weekly meetings with the user within a temporal window (e.g., inclusive of the last two weeks and the upcoming two weeks), and Jane Doe may have had only one meeting with the user within the temporal window. The customization module 350 scores the directory entry associated with Joe Smith higher than the directory entry associated with Jane Doe, such that when the messaging directory is displayed to the user the directory entry for Joe Smith is displayed before the directory entry for Jane Doe. Thus, the order of presentation of the directory entries for a particular user corresponds to how likely a user is to interact with a particular directory entry. For example, the user has the highest likelihood of interacting with the directory entry presented first (e.g., at the top of the list) and is the least likely to interact with the directory entry presented last (e.g., at the bottom of the list). Moreover, because the order of the directories are customized based on a user's contacts information, different users associated with the same messaging directory may be presented the same directory entries but in different orders that are custom to each user. In alternate embodiments, the customization module 350 may order the directory entries for presentation to the user by some other means, e.g., alphabetical listing, by department (e.g., sales, marketing, human resources, etc.), etc. The customization module 350 provides the customized messaging directory to the communications module 360.

The communications module 360 manages communications of users of various enterprises. The communications module 360 communicates portions of a customized messaging directory to the user device 100. In some embodiments, the communicated portions of the customized messaging directory include only names and email addresses associated with the directory entries in the messaging directory. In alternate embodiments, the communicated portions of the customized messaging directory may additionally include other information associated with the directory entries. The communications module 360 may include other information that is already present in the user's contacts information. Additionally, the communications module 360 may include and/or exclude other information in accordance with privacy settings associated with each of the entities in the messaging directory. For example, Joe Smith may allow his mobile number to be included in the directory entry, but not his home address. The communications module 360 may push the customized messaging directory to the user device 100 or provide the customized messaging directory to the user device 100 in response to a request from the user device 100.

The communications module 360 also communicates messages to users via user devices (e.g., 100, 120, and 130). The communications module 360 receives a message from the user device 100. The message includes recipient information describing an intended recipient of the message content. Recipient information may be a name, a enterprise email address, some other identifier that may be used to identify an entity or a group of entities in the messaging directory, or some combination thereof. The communications module 360 identifies recipients using the recipient information. In some embodiments, the recipient information specifically identifies individual recipients (e.g., Joe Smith). Additionally, in some embodiments, the recipient information may designate a group of recipients (e.g., employees in San Francisco office). The communications module 360 then identifies individual recipients associated with the group using the messaging directory.

The communications module 360 determines delivery techniques for providing the message to the identified recipients. A delivery technique is a methodology of providing a message from the directory server 140 to user devices. A delivery technique may be, for example, email, push notifications, SMS, some other means to deliver content to a user device, or some combination thereof. The communications module 360 evaluates potential delivery techniques for messages and selects the technique that best meets its needs. If the enterprise messaging module 170 is installed on the user device associated with the recipient, the communications module 360 sends the message as push notification to that user device. If the user device associated with the recipient does not include the messaging module 170, the communications module 360 selects some other delivery technique (e.g., email). The communications module 360 then provides the message to the identified recipients in accordance with the determined delivery technique.

In some embodiments, the communications module 360 receives poll feedback from user devices that were sent a poll by the user device 100. A poll is a message that asks the recipient to provide feedback to one or more questions. The poll may be, for example, binary, multiple choice, open ended, some other type of questionnaire, or some combination thereof. Poll feedback are answers to the received poll. In some embodiments, the communications module 360 may perform some analysis on the received poll feedback (e.g., aggregate number of users who voted in a particular way, determine number of users who answered the poll, etc.). In some embodiments, the communications module 360 generates a poll feedback report describing the results of the analysis and provides the poll feedback report to the user device 100.

Figure 4:
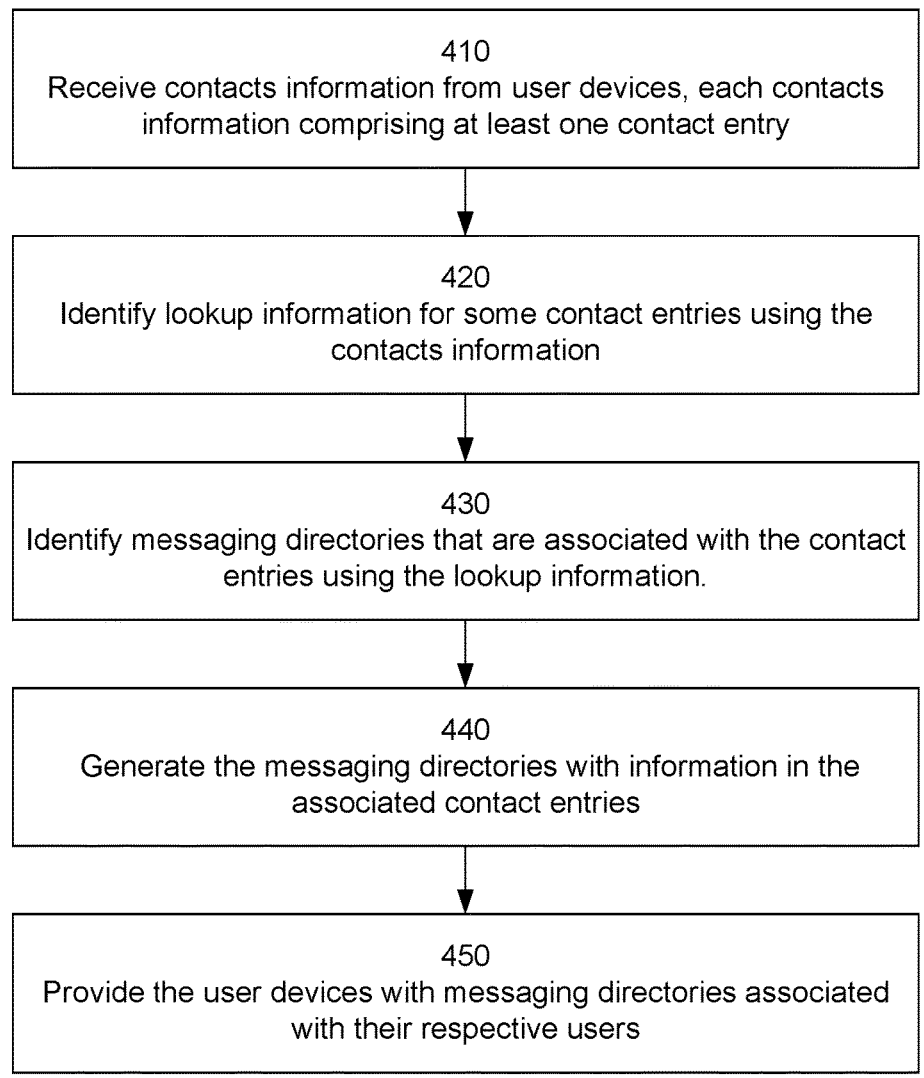
FIG. 4 is a flowchart illustrating a process of updating a messaging directory based on a user's contacts information according to one embodiment.

FIG. 4 is a flowchart illustrating a process of updating a messaging directory based on a user's contacts information according to one embodiment. In one embodiment, the process of FIG. 4 is performed by the directory server 140. Other entities may perform some or all of the steps of the process in other embodiments. Likewise, embodiments may include different and/or additional steps, or perform the steps in different orders.

The directory server 140 receives 410 contacts information from user devices 100. The contacts information received from each user device includes at least one contact entry. An enterprise messaging module 170 operating on each of the user devices 100 may retrieve the contacts information from each user device 100, and provides the contacts information to the directory server 140.

The directory server 140 identifies 420 lookup information for some contact entries using the contacts information. The directory server 140 separates the contacts information into individual contact entries. The directory server 140 identifies lookup information used to map some or all of the contact entries to enterprises (e.g., via a directory lookup table). In some embodiments, the directory server 140 identifies and removes personal email addresses from the lookup information. Additionally, in some embodiments where no lookup information is identified for a contact entry—the contact entry may be removed from the contacts information.

The directory server 140 identifies 430 messaging directories that are associated with the same enterprise as the contact entries using the lookup information. For example, the directory server 140 may use the directory lookup table and the lookup information (e.g., the domain component of an email address) associated with a contact entry to identify a messaging directory that is associated with the same enterprise as the contact entry. Additionally, if the directory lookup table does not identify a messaging directory for the lookup information associated with a contact entry, the directory server 140 creates a new messaging directory associated with some or all of the lookup information (e.g., company name, domain component of an email address, etc.). The directory server 140 then adds the messaging directory to the lookup table.

The directory server 140 generates 440 the messaging directories with information in the associated contact entries. The directory server 140 determines whether a directory entry exists in a messaging directory that corresponds to an associated contact entry. Based on this determination, the directory server 140 either creates a new directory entry using some or all of the information in the contact entry or determines whether to update an existing directory entry with some of the information in the contact entry.

The directory server 140 provides 450 the user devices with messaging directories that are associated with the same enterprise as their respective users. The directory server 140 identifies which messaging directory and user are associated with the same enterprise (e.g., using information provided by the user), and based on this determination provides the identified messaging directory to the user device associated with that user. Additionally, in some embodiments, the directory server 140 may customize the ordering of directory entries within the messaging directory before providing it to a user device. For example, the directory entries may be ordered in a manner custom to each user that reflects a likelihood of interaction between the user and the directory entries. Additionally, in some embodiments, if a user device 100 has already been provided a messaging directory, the directory server 140 provides the user device 100 with updates to the messaging directory.

Figure 5:
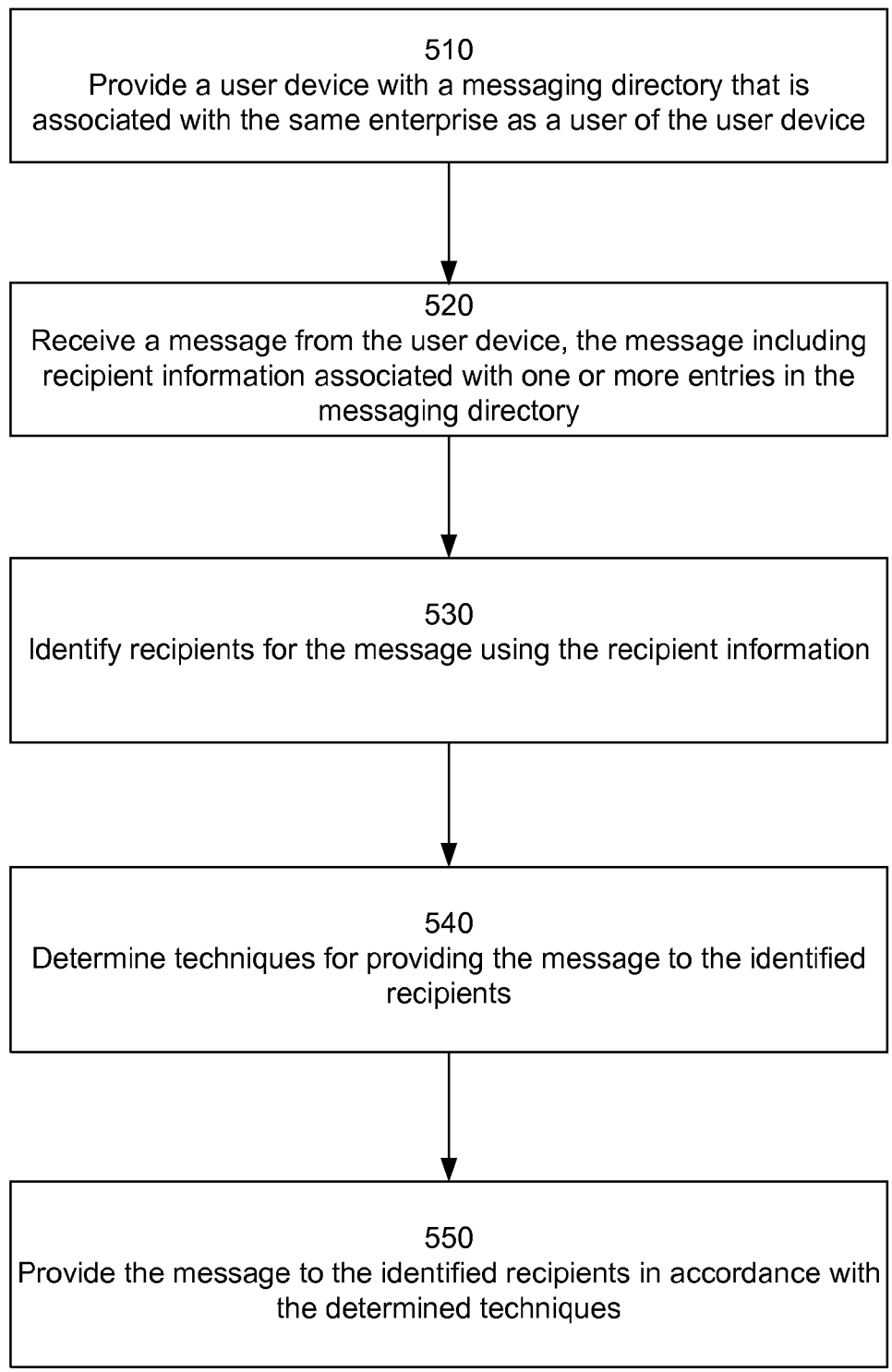
FIG. 5 is a flowchart illustrating a process of distributing a message to one or more users associated with an enterprise according to one embodiment.

FIG. 5 is a flowchart illustrating a process of distributing a message to one or more users associated with an enterprise according to one embodiment. In one embodiment, the process of FIG. 5 is performed by the directory server 140. Other entities may perform some or all of the steps of the process in other embodiments. Likewise, embodiments may include different and/or additional steps, or perform the steps in different orders.

The directory server 140 provides 510 a user device 100 with a messaging directory associated with the same enterprise as a user of the user device 100. In some embodiments, each directory entry in the messaging directory only includes an associated name and enterprise email address. In other embodiments, one or more of the directory entries may include additional information (e.g., a contact job title, contact phone number, etc.), subject to, e.g., the privacy settings of the entities associated with the directory entries and the information already present in the contacts information on the user device 100.

The directory server 140 receives 520 a message from the user device 100, the message includes recipient information associated with one or more entries in the messaging directory. The directory server 140 identifies 530 recipients for the message using the recipient information. For example, the directory server 140 may identify the recipients using the messaging directory.

The directory server 140 determines 540 delivery techniques for providing the message to the identified recipients. For example, if an identified recipient is associated with a user device 100 that includes an enterprise messaging module 170 the delivery technique may be a push notification. If not, the delivery technique may be email. The directory server 140 then provides 550 the message to the identified recipients in accordance with the determined technique.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating messaging directories and messaging members of those directories. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for generating messaging directories, comprising:
   receiving contacts information from user devices, the user devices associated with different users, the contacts information for each user device comprising one or more contact entries;
   identifying lookup information for each contact entry of a plurality of contact entries using the contacts information, the lookup information for each contact entry including at least one of: an identifier for an enterprise which is associated with a user identified by the contact entry, and a domain component of an email address that is specific to an enterprise which is associated with a user identified by the contact entry;
   for each of the plurality of contact entries,
      identifying, using the identified lookup information, a messaging directory associated with the same enterprise as the contact entry, the messaging directory stored in a directory database storing a plurality of messaging directories, each of the plurality of messaging directories storing a respective plurality of directory entries, and
      responsive to a determination that a directory entry corresponding to the contact entry does not exist in the identified messaging directory, creating a directory entry in the identified messaging directory using information in the contact entry,
      wherein a user is provided access to the identified messaging directory based in part on the user being associated with the same enterprise as the identified messaging directory;
   identifying a messaging directory associated with a first user, wherein the identified messaging directory and the user are associated with the same enterprise and the messaging directory includes a plurality of directory entries;
   providing the identified messaging directory to an enterprise messaging module on a user device associated with the first user, the enterprise messaging module configured to:
      present the directory entries in the messaging directory to the first user, receive a selection by the first user of one or more of the directory entries, and
generate a message to be sent to one or more recipients, each of the recipients associated with one of the directory entries selected by the first user;
receiving the generated message from the user device, the message including recipient information specifying the recipients for the message;
identifying the recipients for the message using the recipient information; and
providing the message to the identified recipients.

2. The computer-implemented method of claim 1, wherein identifying lookup information for each contact entry of a plurality of contact entries using the contacts information, further comprises:
parsing the contacts information into a set of contact entries;
identifying some contact entries, in the set of contact entries, that include lookup information, wherein the lookup information for each of the identified contact entries includes: a domain component of an email address that is specific to an enterprise which is associated with a user identified by the contact entry.

3. The computer-implemented method of claim 2, wherein identifying some contact entries, in the set of contact entries, that include lookup information, wherein the lookup information for each of the identified contact entries includes a domain component of an email address that is specific to an enterprise which is associated with a user identified by the contact entry, further comprises:
identifying contact entries, of the set of contact entries, that include email addresses; and
identifying which of the email addresses have a domain component associated with an enterprise or are personal email addresses.

4. The computer-implemented method of claim 1, wherein identifying, using the identified lookup information, a messaging directory associated with the same enterprise as the contact entry, further comprises:
using a directory lookup table to identify the messaging directory, wherein the directory lookup table maps domain components of email addresses that are specific to enterprises to corresponding messaging directories for those enterprises.

5. The computer-implemented method of claim 1, wherein providing the message to the identified recipients comprises:
determining techniques for providing the message to each of the identified recipients based in part on whether an enterprise messaging module is installed on the user devices associated with the recipients, wherein the enterprise messaging module presents the messaging directory to the user; and
providing the message to the identified recipients in accordance with the determined techniques.

6. The computer-implemented method of claim 1, wherein only names of entities associated with the directory entries are available for presentation to the user by the enterprising messaging module of the user device.

7. The computer-implemented method of claim 1, further comprising:
prior to providing a messaging directory to a user device associated with a user, wherein the messaging directory and the user are associated with the same enterprise:
receiving contacts information from the user device, wherein the contacts information includes calendar information associated with the user,
scoring the plurality of directory entries using the contacts information received from the user device, and
ordering the plurality of directory entries according to their respective score, such that directory entries are presented to the user according to a likelihood of interaction between the user and the directory entries; and
providing the messaging directory to the user device.

8. A non-transitory computer-readable storage medium storing executable computer program instructions for generating messaging directories, the instructions executable to perform steps comprising:
receiving contacts information from user devices, the user devices associated with different users, the contacts information for each user device comprising one or more contact entries;
identifying lookup information for each contact entry of a plurality of contact entries using the contacts information, the lookup information for each contact entry including at least one of: an identifier for an enterprise which is associated with a user identified by the contact entry, and a domain component of an email address that is specific to an enterprise which is associated with a user identified by the contact entry;
for each of the plurality of contact entries,
identifying, using the identified lookup information, a messaging directory associated with the same enterprise as the contact entry, the messaging directory stored in a directory database storing a plurality of messaging directories, each of the plurality of messaging directories storing a respective plurality of directory entries, and
responsive to a determination that a directory entry corresponding to the contact entry does not exist in the identified messaging directory, creating a directory entry in the identified messaging directory using information in the contact entry,
wherein a user is provided access to the identified messaging directory based in part on the user being associated with the same enterprise as the identified messaging directory;
identifying a messaging directory associated with a user, wherein the identified messaging directory and the user are associated with the same enterprise and the messaging directory includes a plurality of directory entries;
providing the identified messaging directory to an enterprise messaging module on a user device associated with the user, the enterprise messaging module configured to:
present the directory entries in the messaging directory to the user,
receive a selection by the user of one or more of the directory entries, and
generate a message to be sent to one or more recipients, each of the recipients associated with one of the directory entries selected by the user;
receiving the generated message from the user device, the message including recipient information specifying the recipients for the message;
identifying the recipients for the message using the recipient information; and
providing the message to the identified recipients.

9. The computer-readable medium of claim 8, wherein identifying lookup information for each contact entry of a plurality of contact entries using the contacts information, further comprises:
  parsing the contacts information into a set of contact entries;
  identifying some contact entries, in the set of contact entries, that include lookup information, wherein the lookup information for each of the identified contact entries includes: a domain component of an email address that is specific to an enterprise which is associated with a user identified by the contact entry.

10. The computer-readable medium of claim 9, wherein identifying some contact entries, in the set of contact entries, that include lookup information, wherein the lookup information for each of the identified contact entries includes a domain component of an email address that is specific to an enterprise which is associated with a user identified by the contact entry, further comprises:
  identifying contact entries, of the set of contact entries, that include email addresses; and
  identifying which of the email addresses have a domain component associated with an enterprise or are personal email addresses.

11. The computer-readable medium of claim 8, wherein identifying, using the identified lookup information, a messaging directory associated with the same enterprise as the contact entry, further comprises:
  using a directory lookup table to identify the messaging directory, wherein the directory lookup table maps domain components of email addresses that are specific to enterprises to corresponding messaging directories for those enterprises.

12. The computer-readable medium of claim 8, wherein providing the message to the identified recipients comprises:
  determining techniques for providing the message to each of the identified recipients based in part on whether an enterprise messaging module is installed on the user devices associated with the recipients, wherein the enterprise messaging module presents the messaging directory to the user; and
  providing the message to the identified recipients in accordance with the determined techniques.

13. The computer-readable medium of claim 8, wherein only names of entities associated with the directory entries are available for presentation to the user by the enterprising messaging module of the user device.

14. The computer-readable medium of claim 8, further comprising:
  prior to providing a messaging directory to a user device associated with a user, wherein the messaging directory and the user are associated with the same enterprise,
    receiving contacts information from the user device, wherein the contacts information includes calendar information associated with the user,
    scoring the plurality of directory entries using the contacts information received from the user device, and
    ordering the plurality of directory entries according to their respective score, such that directory entries are presented to the user according to a likelihood of interaction between the user and the directory entries; and
  providing the messaging directory to the user device.

15. A system for generating messaging directories, comprising:
  a processor configured to execute modules; and
  a memory storing the modules, the modules comprising:
  an information selection module configured to:
    receive contacts information from user devices, the user devices associated with different users, the contacts information for each user device comprising one or more contact entries,
    identify lookup information for each contact entry of a plurality of contact entries using the contacts information, the lookup information for each contact entry including at least one of: an identifier for an enterprise which is associated with a user identified by the contact entry, and a domain component of an email address that is specific to an enterprise which is associated with a user identified by the contact entry; and
  a directory identification module configured to:
    for each of the plurality of contact entries,
      identify, using the identified lookup information, a messaging directory associated with the same enterprise as the contact entry, the messaging directory stored in a directory database storing a plurality of messaging directories, each of the plurality of messaging directories storing a respective plurality of directory entries;
  a directory generation module configured to:
    for each of the plurality of contact entries,
      responsive to a determination that a directory entry corresponding to the contact entry does not exist in the identified messaging directory, create a directory entry in the identified messaging directory using information in the contact entry,
      wherein a user is provided access to the identified messaging directory based in part on the user being associated with the same enterprise as the identified messaging directory; and
  a communications module configured to:
    identify a messaging directory associated with a user, wherein the identified messaging directory and the user are associated with the same enterprise and the messaging directory includes a plurality of directory entries,
    provide the identified messaging directory to an enterprise messaging module on a user device associated with the user, the enterprise messaging module configured to:
      present the directory entries in the messaging directory to the user,
      receive a selection by the user of one or more of the directory entries, and
      generate a message to be sent to one or more recipients, each of the recipients associated with one of the directory entries selected by the user,
    receive the generated message from the user device, the message including recipient information specifying the recipients for the message,
    identify the recipients for the message using the recipient information, and
    provide the message to the identified recipients.

16. The system of claim 15, wherein the information selection module is further configured to:
  parse the contacts information into a set of contact entries; and
  identify some contact entries, in the set of contact entries, that include lookup information, wherein the lookup information for each of the identified contact entries includes: a domain component of an email address that is specific to an enterprise which is associated with a user identified by the contact entry.

17. The system of claim 16, wherein the information selection module is further configured to:
- identify contact entries, of the set of contact entries, that include email addresses; and
- identify which of the email addresses have a domain component associated with an enterprise or are personal email addresses.

18. The system of claim 15, wherein the directory identification module is further configured to:
- use a directory lookup table to identify the messaging directory, wherein the directory lookup table maps domain components of email addresses that are specific to enterprises to corresponding messaging directories for those enterprises.

19. The system of claim 15, wherein the communications module is further configured to
- determine techniques for providing the message to each of the identified recipients based in part on whether an enterprise messaging module is installed on the user devices associated with the recipients, wherein the enterprise messaging module presents the messaging directory to the user; and
- provide the message to the identified recipients in accordance with the determined techniques.

20. The system of claim 15, wherein only names of entities associated with the directory entries are available for presentation to the user by the enterprising messaging module of the user device.

* * * * *